(12) United States Patent
Bagheri et al.

(10) Patent No.: US 11,485,057 B2
(45) Date of Patent: Nov. 1, 2022

(54) METHODS OF MANUFACTURING A HIGH FRICTION COMPOSITE MATERIAL FOR FOOTWEAR

(71) Applicant: University Health Network, Toronto (CA)

(72) Inventors: Zahra S. Bagheri, Oshawa (CA); Ali O. Anwer, Toronto (CA); Reza Rizvi, Oshawa (CA); Hani E. Naguib, Toronto (CA); Tilak Dutta, Toronto (CA); Geoffrey Roy Fernie, Toronto (CA)

(73) Assignee: University Health Network, Toronto (CA)

( * ) Notice: Subject to any disclaimer, the term of this patent is extended or adjusted under 35 U.S.C. 154(b) by 636 days.

(21) Appl. No.: 16/378,933

(22) Filed: Apr. 9, 2019

(65) Prior Publication Data

US 2019/0307205 A1    Oct. 10, 2019

Related U.S. Application Data

(60) Provisional application No. 62/655,430, filed on Apr. 10, 2018.

(51) Int. Cl.
*B29C 45/00* (2006.01)
*A43B 13/02* (2022.01)
(Continued)

(52) U.S. Cl.
CPC ........ *B29C 45/0005* (2013.01); *A43B 13/026* (2013.01); *B29C 70/003* (2021.05);
(Continued)

(58) Field of Classification Search
None
See application file for complete search history.

(56) References Cited

U.S. PATENT DOCUMENTS

| 8,575,233 B2 | 11/2013 | Moon |
| 2002/0025395 A1 | 2/2002 | Umezawa |

(Continued)

FOREIGN PATENT DOCUMENTS

| CN | 2496272 Y | 6/2002 |
| CN | 1575682 A | 2/2005 |

(Continued)

OTHER PUBLICATIONS

Anwer, Ali, et al. "Evolution of the coefficient of friction with surface wear for advanced surface textured composites." Advanced Materials Interfaces 4.6 (Jan. 27, 2017): 1600983. (Year: 2017).*

(Continued)

*Primary Examiner* — Benjamin A Schiffman
(74) *Attorney, Agent, or Firm* — Young Basile Hanlon & MacFarlane, P.C.

(57) ABSTRACT

The present invention provides a method of producing the composite comprising: a) melt blending the matrix with the fibers to produce a melted composite, b) injecting the melted composite into a mold and allowing the melted composite to solidify and, c) removing at least a portion of the outermost layer of a composite such that the fibers protrude from the surface of the composite. Also provided is composite produced by the methods of the invention comprising soft and hard fibers embedded in a soft rubber-like matrix, wherein the fibers protrude from the composite's surface. In specific embodiments, the composite comprises carbon fibers and poly(p-phenylene-2,6-benzobisoxazole) (PBO) fibers in a thermoplastic polyurethane (TPU) matrix, wherein the fibers protrude from the composite's surface. Slip-resistant product comprising the composite are also provided.

14 Claims, 6 Drawing Sheets

(51) Int. Cl.

| | |
|---|---|
| *B29D 35/00* | (2010.01) |
| *B29D 35/12* | (2010.01) |
| *B29C 70/00* | (2006.01) |
| *B29C 70/06* | (2006.01) |
| *B29K 75/00* | (2006.01) |
| *B29K 507/04* | (2006.01) |
| *A43B 13/22* | (2006.01) |
| *A43B 13/26* | (2006.01) |
| *A43B 13/12* | (2006.01) |

(52) U.S. Cl.
CPC .......... *B29C 70/06* (2013.01); *B29D 35/0009* (2013.01); *B29D 35/122* (2013.01); *A43B 13/122* (2013.01); *A43B 13/223* (2013.01); *A43B 13/26* (2013.01); *B29K 2065/00* (2013.01); *B29K 2075/00* (2013.01); *B29K 2265/00* (2013.01); *B29K 2465/00* (2013.01); *B29K 2507/04* (2013.01)

(56) References Cited

U.S. PATENT DOCUMENTS

| | | |
|---|---|---|
| 2004/0005447 A1 | 1/2004 | Takehara et al. |
| 2008/0050516 A1 | 2/2008 | Dickinson |
| 2010/0330335 A1 | 12/2010 | Ciupak et al. |
| 2011/0189460 A1 | 8/2011 | Chavdar |
| 2011/0289801 A1 | 12/2011 | Amos et al. |
| 2012/0180343 A1 | 7/2012 | Auger et al. |
| 2013/0047465 A1 | 2/2013 | Auger et al. |
| 2013/0067774 A1 | 3/2013 | Auger et al. |
| 2013/0067776 A1 | 3/2013 | Auger et al. |
| 2015/0047224 A1 | 2/2015 | Zhao et al. |
| 2015/0296926 A1 | 10/2015 | Audet et al. |
| 2016/0113353 A1 | 4/2016 | Tateishi |

FOREIGN PATENT DOCUMENTS

| | | |
|---|---|---|
| CN | 202588489 U | 12/2012 |
| JP | H11164707 A | 6/1999 |
| JP | 2002294072 A | 10/2002 |

OTHER PUBLICATIONS

Chen, Beibei, et al. "Fiber hybrid polyimide-based composites reinforced with carbon fiber and poly-p-phenylene benzobisthiazole fiber: Tribological behaviors under sea water lubrication." Polymer Composites 37.6 (Dec. 4, 2014): 1650-1658. (Year: 2014).*

Rizvi, Reza, et al. "Multifunctional textured surfaces with enhanced friction and hydrophobic behaviors produced by fiber debonding and pullout." ACS applied materials & interfaces 8.43 (Oct. 7, 2016): 29818-29826. (Year: 2016).*

Rizvi, Reza, et al. "High friction on ice provided by elastomeric fiber composites with textured surfaces." Applied physics letters 106.11 (Mar. 17, 2015): 111601. (Year: 2015).*

Fu, S-Y., et al. "Tensile properties of short-glass-fiber-and short-carbon-fiber-reinforced polypropylene composites." Composites Part A: Applied Science and Manufacturing 31.10 (Aug. 24, 2000): 1117-1125. (Year: 2000).*

Suresha, B. "Friction and dry slide wear of short glass fiber reinforced thermoplastic polyurethane composites." Journal of reinforced plastics and composites 29.7 (Nov. 27, 2008): 1055-1061. (Year: 2008).*

Friedrich, Klaus, Zhong Zhang, and Alois K. Schlarb. "Effects of various fillers on the sliding wear of polymer composites." Composites science and technology 65.15-16 (Jul. 28, 2005): 2329-2343. (Year: 2005).*

Bagheri, Z. Shaghayegh, et al. "Effects of multi-functional surface-texturing on the ice friction and abrasion characteristics of hybrid composite materials for footwear." Wear 418 (Nov. 30, 2018): 253-264. (Year: 2018).*

Bely, V.A., et al., Chapter 1—Frictional Interaction During Metal-Polymer Contact, in Friction and Wear in Polymer-Based Materials. 1982, Pergamon, p. 3-22.

Peters, S.T., Handbook fo Composites. 2nd edition ed. 1998, London, Uk: Chapman and Hall.

El-Sayed, A.A., et al., Friction and wear properties of polymeric composite materials for bearing applications. Wear, 1995. 184(1): p. 45-53.

Visconti, I.C., et al., The Wear Behaviour of Composite Materials with Epoxy Matrix Filled with Hard Powder. Applied Composite Materials, 2001. 8(3): p. 179-189.

Aldousiri, et al., A Review on Tribological Behaviour of Polymeric Composites and Future Reinforcements. Advances in Materials Science and Engineering, 2013. 2013: p. 8.

Sudheer, M., et al., Optimization of Dry Sliding Wear Performance of Ceramic Whisker Filled Epoxy Composites Using Taguchi Approach. Advances in Tribology, 2012. 2012: p. 9.

Siddhartha, et al., Mechanical and dry sliding wear characterization of epoxy-TiO2 particulate filled functionally graded composites materials using Taguchi design of experiment. Materials & Design, 2011. 32(2): p. 615-627.

Chen, B., et al., Fiber hybrid polyimide-based composites reinforced with carbon fiber and poly-p-phenylene benzobisthiazole fiber: Tribological behaviors under sea water lubrication. Polymer Composites, 2016. 37(6): p. 1650-1658.

Li, T., et al., Sliding Friction Behaviors of Poly (p-Phenylene Benzobisoxazole) (PBO) Film under Different Conditions. Journal of Macromolecular Science, Part B, 2008. 47(4): p. 723-734.

Rizvi, R., et al., Multifunctional Textured Surfaces with Enhanced Friction and Hydrophobic Behaviors Produced by Fiber Debonding and Pullout. ACS Applied Materials & Interfaces, 2016.

Rizvi, R., et al., High friction on ice provided by elastomeric fiber composites with textured surfaces. Applied Physics Letters, 2015. 106(11): p. 111601.

Bowden, F.P., et al., The Area of Contact between Stationary and between Moving Surfaces. Proceedings of the Royal Society of London. Series A, Mathematical and Physical Sciences, 1939. 169(938): p. 391-413.

Persson, B.N.J., On the theory of rubber friction. Surface Science, 1998. 401(3): p. 445-454.

Rosenberg, R., Why is ice slippery? Physics Today, 2005. 50.

Bowden, F.P., et al., The Mechanism of Sliding on Ice and Snow. Proceedings of the Royal Society of London. Series A, Mathematical and Physical Sciences, 1939. 172(949): p. 280-298.

Autumn, K., et al., Adhesive force of a single gecko foot-hair. Nature, 2000. 405(6787): p. 681-685.

Laurenti, M., et al., How Micropatterning and Surface Functionalization Affect the Wetting Behavior of ZnO Nanostructured Surfaces. Advanced Materials Interfaces, 2016. 3(13): p. 1600110-n/a.

Lee, B.K., et al., Fabrication of Large-Area Hierarchical Structure Array Using Siliconized-Silsesquioxane as a Nanoscale Etching Barrier. ACS Applied Materials & Interfaces, 2015. 7(24): p. 13490-13496.

Wang, T., et al., Fabrication and Hydrophobic Properties of Column-Array Silicon Using Wood-Structured Silver-Assisted Chemical Etching. Advanced Materials Interfaces, 2016. 3(19): p. 1600552-n/a.

Dunn, A., et al., Laser surface texturing for high friction contacts. Applied Surface Science, 2015. 357, Part B: p. 2313-2319.

Roy, R.K., A primer on the Taguchi Method 1990, New York, NY, USA: Van Nostrand Reinhold.

Pihtili, H., et al., Investigation of the wear behaviour of a glass-fibre-reinforced composite and plain polyester resin. Composites Science and Technology, 2002. 62(3): p. 367-370.

Ritchie, R.O., The conflicts between strength and toughness. Nat Mater, 2011. 10(11): p. 817-822.

Zhang, Y., et al., A novel surface modification of carbon fiber for high-performance thermoplastic polyurethane composites. Applied Surface Science, 2016. 382: p. 144-154.

Botelho, E.C., et al., Mechanical behavior of carbon fiber reinforced polyamide composites. Composites Science and Technology, 2003. 63(13): p. 1843-1855.

(56) References Cited

OTHER PUBLICATIONS

Young, R.J., et al., The structure and deformation behaviour of poly(p-phenylene benzobisoxazole) fibres. Journal of Materials Science, 1990. 25(1): p. 127-136.

Chen, B., et al., Comparative investigation on the tribological behaviors of CF/PEEK composites under sea water lubrication Tribology International, 2012. 52: p. 170-177.

Chen, B., et al., Synergism of Poly(p-phenylene benzobisoxazole) Microfibers and Carbon Nanofibers on Improving the Wear Resistance of Polyimide-Matrix Composites in Sea Water. Tribology Letters, 2015. 57(1): p. 7.

Park, J.H., et al., Significant enhancement in compressive strength of poly(p-phenylenebenzobisoxazole) fibers by incorporation of carbon nanofibers. Fibers and Polymers, 2016. 17(8): p. 1317-1321.

Evans, D.C.B., et al., The Kinetic Friction of Ice. Proceedings of the Royal Society of London. A. Mathematical and Physical Sciences, 1976. 347(1651): p. 493-512.

Marmo, B.A., et al., Ice friction, wear features and their dependence on sliding velocity and temperature. Journal of Glaciology, 2005. 51(174): p. 391-398.

Blackford, J.R., et al., Friction on ice: stick and slip. Faraday Discussions, 2012. 156(0): p. 243-254.

Crowson, R.J., et al., Rheology of short glass fiber-reinforced thermoplastics and its application to injection molding I. Fiber motion and viscosity measurement. Polymer Engineering & Science, 1980. 20(14): p. 925-933.

Lin, H., et al., Synthesis and Properties of Poly[p-(2,5-dihydroxy)-phenylenebenzobisoxazole] Fiber. International Journal of Molecular Sciences, 2008. 9(11): p. 2159-2168.

Saeki, H., et al., The Coefficient of Friction Between Sea Ice and Various Materials Used in Offshore Structures. Journal of Energy Resources Technology, 1986. 108(1) p. 65-71.

Qin, D., et al., Rapid prototyping of complex structures with feature sizes larger than 20 μm. Advanced Materials, 1996. 8(11): p. 917-919.

\* cited by examiner

METHODS OF MANUFACTURING A HIGH FRICTION COMPOSITE MATERIAL FOR FOOTWEAR

CROSS-REFERENCE TO RELATED APPLICATIONS

The present application claims priority to provisional Ser. No. 62/655,430, filed on Apr. 10, 2018 the teachings of which are incorporated by reference herein for all purposes.

FIELD

The present invention pertains to the methods of manufacture of high friction composite materials comprising soft and hard fibers in a matrix which may be for use on footwear to improve their slip resistance on surfaces covered in ice and/or snow.

BACKGROUND

Polymer-based composite materials are a rapidly growing class of materials due to their capacity to demonstrate properties unachievable in monolithic materials. The tailorable structure of this material allows tuning of their properties for a prescribed value via using customized component content, distribution, degree of crystallinity, morphology as well as structure. Owing to this strong tailorability, composite materials are attractive substitutes to monolithic metallic materials in various industries and constitute most commercial engineering components. The recent advent of synthetic composite materials have found an extensive use as tribiological components, including cams, breaks, bearings, because of their superior wear-resistance properties and self-lubrication performance. This is expected, considering the significant economic effect of wear and friction and as a result the extensive production of dry lubricants and plastic bearings. In particular, there has been a recent interest in the use of novel composite materials for footwear outsoles which have been shown to grip ice better than existing conventional materials.

Generally, polymeric materials demonstrate higher coefficient of friction (COF) compared to metallic material contacting hard surfaces (modulus ~100 GPa). This could be related to the softer nature of this material because of their lower modulus (~0.1 GPa), that enables them to mold against asperities and pair with hard substrate underneath, thereby ensuring a large contact area as well as adequate mechanical traction. In addition, viscoelastic properties of polymeric materials cause them to exhibit strong hysteresis upon deformation which results in grip being maintained even if the load is reduced or removed. However, traction on ice is far more challenging than a typical solid substrate due to the polar nature of water molecules. Polar water molecules expose disordered dangling hydrogen bonds at the surface that manifest themselves as a quasi-liquid layer, thereby acting as a lubricant and define the dominant mechanism of friction.

Biomimetic surface texturing is a potential solution to improve ice friction properties as evidenced in the setae and spatula structural hierarchy in gecko's feet. The bulges created during the texturing process promote anti-slip surface tension by penetrating the substrate underneath, yet limit the durability and useful lifetime of the material due to their susceptibility to wear. Synthetic approaches are one of the most commonly used technologies to create surface texturing, in which subtractive process are employed to impart micro-/nanometer-sized structures on material surfaces. Some example of subtractive process include ion beam, photolithography, plasma etching, chemical etching as well as laser surface texturing. The drawback with some of these subtractive processes is their complexity to create compositional heterogeneity across the surface, which limits their application when such feature is desired. Further pre- and post-processing steps are required to create textured surface with different composition as that of the substrate. This makes these process complex in nature and adds the high cost to the final product.

To address these shortcomings, a methodology that utilizes the phenomenon of fiber de-bonding and pullout process to expose the fibrous phase from the matrix surface was developed. Using this method, a textured surface was created without the need for any further post processing utilized by other alternative texturing technologies. This method comprised the following steps: melt blending the matrix material with fibers; injecting the blend into an injection mold which was bar shaped and allowing it to solidify; cutting the solidified bar into strips to expose the embedded fibers inside the matrix and reorienting the cut strips and refusing the strips (see FIG. 12). It was found that Thermoplastic Polyurethane (TPU) composites of carbon fiber and PBO exhibited high Coefficient of Friction (COF) before and after simulated wear, respectively.

However, there is a need in the art for better methods for creating a better combination of slip-resistance and wear resistance properties and products produced from such materials. Moreover, a further simplified method which may be more amendable to being scaled up for industrial manufacturing.

This background information is provided for the purpose of making known information believed by the applicant to be of possible relevance to the present invention. No admission is necessarily intended, nor should be construed, that any of the preceding information constitutes prior art against the present invention.

SUMMARY

An object of the present invention is to provide methods of manufacturing a high friction composite material for footwear. In accordance with an aspect of the present invention, there is provided a method of producing a composite said method comprising: a) melt blending matrix with fibers to produce a melted composite, b) injecting the melted composite into a mold and allowing the melted composite to solidify and, c) optionally removing at least a portion of the outermost layer of a composite such that the fibers protrude from the surface of the composite.

DETAILED DESCRIPTION

The present invention is based on the finding that composite materials comprising soft fibers and hard fibers embedded in a soft matrix produced by a fiber de-bonding and pull-out method have a structure in which the fibers protrude out from the material's surface. The hard fibers extending out of the surface of the material can penetrate hard substrates, such as ice, while the soft components (the soft fibers and soft matrix) can sufficiently deform and mold against the hard substrates, thereby ensuring a large contact area and very high mechanical interlocking. Given the high friction properties of the composite materials created using the methods of the present invention, these composite materials have potential as slip-resistant products and may be used for example for incorporation into slip-resistant footwear.

Accordingly, the present invention provides the methods of manufacture of a composite material (also referred to herewith as "composite") comprising soft and hard fibers embedded in a soft matrix and optionally protruding from the surface of the matrix, composite materials produced by the methods of the present invention and products comprising the composite material. In certain embodiments, the methods of the present invention comprise the following steps: a) melt blending matrix with fibers to produce a melted composite, b) injecting the melted composite into a mold and allowing the melted composite to solidify and, c) optionally removing at least a portion of the outermost layer of a composite such that the fibers protrude from the surface of the composite. The methods of the present invention allow for the creation of coupons with textured composite surfaces with minimal post processing. In particular, the present invention producing textured coupons without the inconvenience of delamination of the fused strips.

As used herein, "high friction" refers to a material having a coefficient of friction on ice greater than 0.2. Tests for measuring friction are known in the art [11, 12] and described in detail in the Example. In certain embodiments, the composites created using the method of the present invention have a coefficient of friction on ice greater than 0.3; greater than 0.4; greater than 0.5. A worker skilled in the art would readily appreciate that the actual coefficient of friction measured is dependent on the type of ice used in the test: melting ice (ice covered with a thin layer of liquid water) or bare ice (no liquid water present on the ice surface). In certain embodiments, composites produced by the methods of the present invention had a higher coefficient of friction on melting ice than on bare ice. In certain embodiments, the coefficient of friction on ice increases after abrasion.

In certain embodiments, the surface of the composite produced by the methods of the present invention is textured. In particular, in certain embodiments, the method results in the soft fibers and hard fibers protruding out from surface of the matrix thereby causing a textured surface to the composite. Surface texturing may be quantified through measurement of their surface roughness (Ra). Tests for determining the extent of texturing are known in the art and described in detail in the Example. In certain embodiments, the texturing (i.e. roughness) increases after abrasion.

The ability of the protruding fibers to grip a surface and therefore the coefficient of friction of the composite may be dependent on the orientation of the fibers. Accordingly, in certain embodiments, the method of the present invention produces a composite in which the orientation of all the fibers is substantially uniform. In certain embodiments, substantially all the fibers are longitudinally aligned. In certain embodiments, the orientation of substantially all the fibers is such that end portions of the fibers protrude from the surface of the matrix. In certain embodiments, substantially all the fibers extend substantially vertically out from the surface.

The average protrusion length of the fibers may also impact the coefficient of friction of the composite on ice. In certain embodiments the methods of the present invention produce a composite in which the average protrusion length of the fibers is greater than 50 µm, greater than or equal to 100 µm, greater than or equal to 125 µm or greater than or equal to 150 µm. In specific embodiments, the average protrusion length is about 125 µm.

In certain embodiments the methods of the present invention produce a composite in which the protrusion length of the soft fibers is substantially the same as the protrusion length of the hard fibers.

In certain embodiments the methods of the present invention produce a composite in which the protrusion length of the fibers is random.

In certain embodiments the methods of the present invention produce a composite in which the protrusion length of the soft fibers is different than the protrusion length of the hard fibers. In certain embodiments the methods of the present invention produce a composite in which the protrusion length of the soft fibers is less than the protrusion length of the hard fibers. In specific embodiments, the protrusion length of the hard fibers is about 170 μm and about 80 μm for the soft fibers.

In certain embodiments the methods of the present invention produce a composite in which the protrusion length of the fibers is random.

In certain embodiments, the properties of the composite, including but not limited to the coefficient of friction, produced by the method of the present invention may be dependent on the percentage of total fibers (by total volume; vol %) used in the method. Accordingly, the fibers comprise about 1 vol % to about 32 vol % of the components used in the production of the composite. In certain embodiments, the fibers comprise about 1 vol % to about 10 vol % of the components used in the production of the composite. In certain embodiments, the fibers comprise about 1 vol % to about 8 vol % of the components used in the production of the composite. In certain embodiments, the fibers comprise about 4 vol % to about 8 vol % of the components used in the production of the composite. In specific embodiments, the fibers comprise about 8 vol % of the components used in the production of the composite.

The ratio of hard to soft fibers used in the methods of the present invention may also be varied. In certain embodiments, the ratio of hard to soft fibers (by weight) is 2:1. In other embodiments, the ratio of hard to soft fibers by weight is 2:1, 1:1, 1:2, or 1:3

In certain embodiments, the methods of the present invention produce wear resistant composites. The effect of abrasion resistance on the composite surface may be examined using tests known in the art and described in detail in the Example. For example, an abrasion resistance index (ARI) may be calculated to provide a quantitative measure to determine the abrasion resistance of a material surface as compared to a standard rubber. In certain embodiments, the composite of the present invention has an ARI greater than 100% (i.e. has a higher abrasion resistance than standard rubber). In certain embodiments, the methods of the present invention produce a composite having an ARI greater than 200%. In certain embodiments, the methods of the present invention produce a composite having an ARI greater than 300%.

Soft fibers as used herein refer to fibers having a relatively lower strength in compression (i.e. compressive strength) as compared to the hard fibers. In certain embodiments the strength in compression of the soft fibers is less than 1 GPa. In certain embodiments, the strength in compression of the soft fibers is about 0.5 GPa. Soft fibers for use in the methods of the present invention include but are not limited to synthetic polymer fibers, such as poly(p-phenylene-2,6-benzobisoxazole) (PBO) fibers; aromatic polyamide fibers including but not limited to poly-p-phenylene terephthalamide fibers and poly-m-phenyleneisophthalamide fibers; polyphenylene sulfide fibers; polyurethane fibers; and nylon or ultra-high molecular weight extended chain polyethylene (UHMPE). In certain embodiments, the soft fibers are PBO fibers. Commercially available PBO fibers include but is not limited to Zylon™ (Toyobo Co., Japan). In specific embodiments, chopped fiber Zylon HM having a diameter about 10 μm and an initial length about 3 mm.

Hard fibers as used herein refer to fibers having a relatively higher strength in compression as compared to the soft fibers. In certain embodiments, the compressive strength is between 10-20 GPa. Hard fibers for use in the methods of the present invention include but are not limited to synthetic inorganic fibers such as carbon fibers, glass fibers, asphalt fibers, graphite fibers, basalt fibers and silicon carbide (SiC).

In certain embodiments, the hard fibers are carbon fibers. Commercially available carbon fibers include but are not limited to Zoltek™ PX35.

In certain embodiments, the fibers for use in the methods of the present invention have a diameter of about 10 μm to about 100 μm. In certain embodiments, the lengths of the fibers for use in the methods of the invention are about 1 mm to about 50 mm. In specific embodiments, the length of the fibers for use in the method are about 3 mm. A worker skilled in the art would appreciate that the fibers may be broken into smaller pieces when mixed in the compounder.

The matrix as used herein refers to low-modulus rubber or rubber-like component or a relatively soft thermoplastic material which can mold against asperities over a hard surface. Matrix for use in the methods of the present invention include but is not limited to soft synthetic rubber materials including but not limited to thermoplastic polyurethane (TPU), polypropylene; polyethylene; ethylvinylacetate; and styrene ethylbutylene styrene. In certain embodiments, the matrix is TPU. TPU is commercially available for example form Lubrizol. In specific embodiments, the TPU has a shore hardness of 55D and mold shrinkage of 0.5-0.9% and 0.6-0.7% in transverse and flow direction, respectively.

In certain embodiments, the composite produced by the methods of the present invention comprises carbon fibers 10 and PBO fibers 12 in a TPU matrix. In specific embodiments, the composite comprises about 8 vol % fibers embedded in a matrix; wherein said fibers comprise carbon fibers and PBO fibers in a 2:1 ratio by weight; wherein said matrix comprises TPU 14, and wherein the fibers protrude from the composite's surface.

Figure 11:
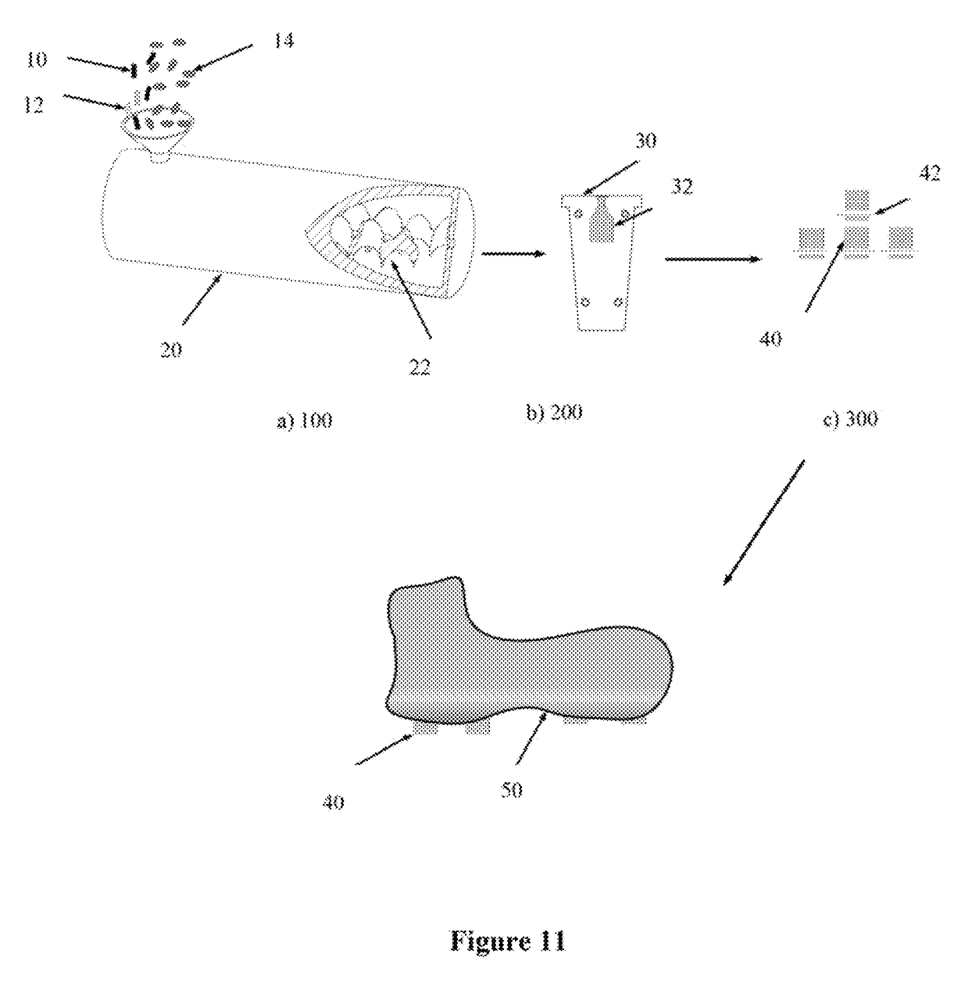
FIG. 11 provides a schematic of manufacturing process and specific mold design to enhance fiber alignment of an embodiment of the present invention. This embodiment of the method comprises the following steps: a) melt blending of fibers and matrix using a melt compounder, b) injecting this uniform blended composite into a mold designed specifically to enhance fiber alignment during the injection process and, c) cutting the end of the injection-molded surface using a sharp cutting tool as to expose fibrous phase on the composite surface.

The method of an embodiment of the present invention is generally detailed below and illustrated specifically with respect to manufacturing coupons comprising a TPU-Carbon fiber-PBO fiber composite in FIG. 11. Generally, the manufacturing process of the present invention comprises the following steps: a) melt blending matrix with fibers to produce a melted composite, b) injecting the melted composite into a mold and allowing the melted composite to solidify and, c) optionally removing at least a portion of the outermost layer of a composite such that the fibers protrude from the surface of the composite.

Melt Blending of Matrix with Fibers to Produce a Melted Composite (e.g., Melt Mixing Process 100)

A melt compounder (i.e. melt mixer 20) comprising mixing screws 22) may be used for melt blending. The temperature and time required to melt the matrix will be dependent on the matrix material used and can be determined by a worker skilled in the art. In certain embodiments, the barrel temperature of the melt compounder is between 185° C. and 300° C. The matrix and fibers is melt mixed for a period of time that is sufficient for uniform mixing. In specific embodiments, TPU is melt blended with fibers at about 250° C. for about 5 minutes.

Injecting the Melted Composite into a Mold.

Next, during the injection molding 200, the melted composite is injected in a mold 30 forming an injected hybrid composite 32. The injection temperature will be dependent on the material used for the matrix and/or amount of fibers. Variations in the injection temperature may impact one or more properties, such as fiber orientation, coefficient of friction and/or abrasion resistance index, of the composite. In certain embodiments, the mold temperature is between 50° C. and 170° C. In certain embodiments, the matrix for use in the method is TPU and the injection temperature is about 50° C. to about 170° C. In specific embodiments, the matrix for use in the method is TPU and the injection temperature is 130° C. A worker skilled in the art could readily determine appropriate injection pressures. In certain embodiments, the injection pressure is about 115 psi. A worker skilled in the art would readily appreciate that a significantly higher pressure may be used in industrial scale injection molds. For example, the pressure for industrial molds may be as high as 20,000 psi.

Optionally, the mold is designed specifically to enhance fiber alignment. In certain embodiments, the mold is designed such that substantially all the fibers are aligned to ensure substantially vertical protrusion of the fibers from the surface of the composite when the outermost portion is removed. In certain embodiments, the mold comprises 3 regions: a) the gate, b) the runner, and c) the desired sample region (i.e. coupon region). The gate region is for mating the injection mold nozzle to the mold. In certain embodiments, a standard nozzle design is used. In certain embodiments, the runner region of the mold is shaped in a frustum. In certain embodiments, the desired sample region (i.e. coupon region) is shaped as a cylinder. In specific embodiments, the mold has a tapered shape and is in a vertical orientation (parallel to the direction of injection) which allows the fibers to stop and solidify in the injection direction which is along the length of the coupon. This allows for exposure of the fibers with a single slice.

In other embodiments, the mold is shaped to form a whole footwear outsole. In such embodiments, multiple nozzles may be used to fill the mold and the mold is oriented in a manner to ensure that the injection direction is downwards towards the bottom of the footwear outsole 50.

In certain embodiments, pressure is applied to the filled mold to ensure there are no unfilled areas. Appropriate pressures are known in the art. The pressure applied may be 100 to 20,000 psi. In certain embodiments, the pressure is 115 psi. A worker skilled in the art would readily appreciate that a significantly higher pressure may be used in industrial scale injection molds. For example, the pressure for industrial molds may be as high as 20,000 psi The mold may be quenched or allowed to cool naturally.

Optionally, removing at least a portion of the outermost layer of a composite such that the fibers protrude from the surface of the composite.

Next at least a portion of the outermost layer of a composite is removed such that the fibers protrude from the surface of the composite. The portion of the outermost layer to be removed may be dependent on the orientation of the fibers. For example, the removal of the end portion of cylindrical forms of the composite in which the fibers are oriented in the direction of the axis of the cylinder would be favorable for producing fibers which protrude substantially vertically from the surface. Any thickness of the outmost layer may be removed so long as it is sufficient to expose the fibers. In certain embodiment at least 2-3 mm is removed. A sharp cutting tool may be used to cut the injection-molded composite, during the cutting process for texturing 300.

In other embodiments, the outmost layer of the composite is not removed. In such embodiments, the composite may be used an abrasion resistant material that shows higher friction on ice as it gets abraded (and fibers are exposed).

The present invention further provides the composite produced by the methods of the invention and products which incorporate the composite of the present invention. The composite may be incorporated into a variety of products which require high friction materials. Such products include slip-resistant or anti-slip products. For example, the composite produced by the methods of the invention may be incorporated into the outsole of footwear.

To gain a better understanding of the invention described herein, the following example is set forth. It will be understood that this example is intended to describe illustrative embodiments of the invention and are not intended to limit the scope of the invention in any way.

EXAMPLE

Ice-Friction Characterization of Multifunctional Surface-Textured Hybrid Composite Materials Using Taguchi Design of Experiment Introduction In a previous study, the effect of abrasion on the coefficient of friction on ice for 10 different composite materials was investigated [12]. It was found that Thermoplastic Polyurethane (TPU) composites of carbon fiber and PBO exhibited high Coefficient of Friction (COF) before and after simulated wear, respectively [12]. To bridge the shortcomings of each of the frictional properties exhibited by these composites, in this example these fibers were combined together to create a hybrid composite structure such that the composite could exhibit higher frictional properties on ice before abrasion as well as after abrasion.

The tribiological performance of the composite material is mainly controlled by the surface characteristics of the microscopic fibrous phase that extend out to the surface, which can be highly affected by the design parameters. Therefore, to have a better combination of slip-resistance and wear resistance properties, the design of the material was optimized by systematically varying a number of manufacturing and testing parameters to evaluate their effect on slip resistance and wear resistance performance using the Taguchi method for robust design.

In this example, using Taguchi orthogonal array design, the effect of various manufacturing and testing parameters was explored, namely fiber content, mold temperature, sliding distance, and applied vertical load each at three levels, on ice frictional properties of our composites. Via an in-house compounding followed by surface ablation, textured composite materials reinforced with a combination of Carbon and PBO fibers were manufactured to have randomly aligned exposed fibrous phase at surface. The surface morphology of the composite was characterized using Scanning Electron Microscopy (SEM) before and after abrasion to evaluate the effect of design parameters on the surface characteristic of the composite. Ice frictional properties were also evaluated at different sliding velocity and load in order to determine the optimized design parameters leading to maximized traction on ice before and after simulated wear.

Materials and Methods

Mold design. The samples were manufactured inside a cylindrical mold with dimensions of 15 mm diameter×17 mm thickness. This allowed for the simplification and acceleration the manufacturing process as compared to a previous study where smaller strips of samples were rejoined to increase the textured composite surface area for abrasion testing [10]. By having such circular shaped sample ends and thickness of 17 mm, there was the ability use these samples directly inside the chuck of the abrasion tester. In addition, since the minimum thickness of the sample required needed to be >2 mm for the Abrasion test based on ISO 20871 standard; there was the ability to manufacture 3 samples from one injection cycle.

Figure 1:
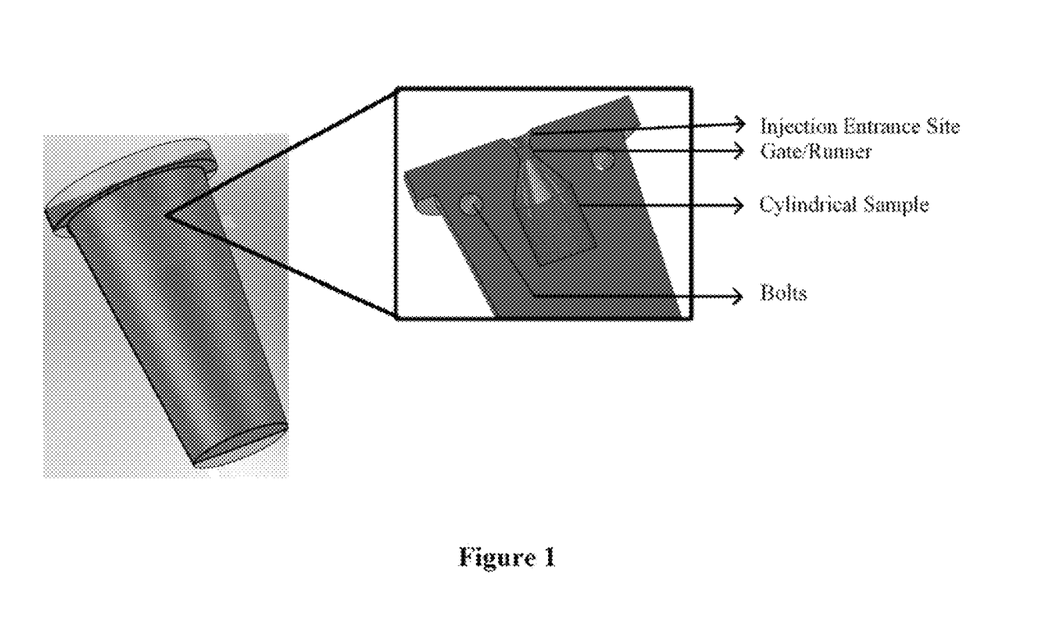
FIG. 1 illustrates a CAD design of a mold for manufacturing cylindrical samples of a composite of an embodiment of the present invention for abrasion testing and simplified texturing process.

The mold comprised of 3 regions: a) the gate, b) the runner, and c) the desired sample region as seen in FIG. 1. FIG. 1 depicts a SolidWorks CAD design of custom abrasion mold for manufacturing cylindrical samples for abrasion texturing and simplified texturing process. For ideal mating between the injection mold nozzle and the mold, a standard nozzle design was used. The runner region of the mold was shaped in a frustum outline with the smaller diameter being the exit diameter of the gate (4 mm), and the larger diameter being the diameter of the desired sample (15.5 mm). This frustum shaped runner allowed a smooth transition of the melted composite material to flow and completely occupy the void volume.

Composite Fabrication. The composite materials used for performing the abrasion testing and the ice friction testing following the Taguchi design of experiment as follows. Initially, Thermoplastic Polyurethane (TPU-Lubrizol) was melt blended inside a DSM Xplore Micro 15 twin screw compounder (DSM Netherlands) at 250° C. for 5 min with varying fiber volume fraction of Carbon Fiber (CF) (Zoltek-Panex 35) and Poly(p-phenylene-2,6-benzobisoxazole) (PBO) (Toyobo Co., Japan). Fibers at volume % of 1, 4 and 8 were used to study the effect of fiber content on the abrasion and ice friction properties of the composite. A maximum of 8 vol % fibrous phase was used to retain compliancy of composite material, while 1 vol % and 4 vol % were used to study the effect of fiber volume fraction on tribiological properties. The fiber phase of the hybrid composite comprising of both CF-PBO were weighed using a fiber ratio of 2:1 CF:PBO based on a previous study by Chen et al. [8]. Following the manufacturing of a uniform composite blend, the extruder was allowed to enter directly into an injection barrel kept at 250° C. The final melt was then injected from the barrel at 115 psi into the customized mold at three different temperatures. The minimum temperature of 120° C. was chosen such that the melted composite blend would have sufficient viscosity to fill the entire mold, while 130° C. and 140° C. were chosen to study the effect of temperature on fiber orientation, friction and abrasion following injection. After successfully manufacturing the cylindrical samples (e.g., composite coupons 40), each cylinder was cut at a cutting line 42 using a sharp blade to expose the fibrous phase forming a textured composite coupon 44. Three samples were made from each cylindrical sample such that the thickness was at least >2 mm, sufficient for abrasion and ice friction testing. Similarly, PBO-TPU composites were also manufactured using the above mentioned procedure and used as a baseline for comparison and studying the effect of incorporating carbon fiber for creating this textured composite. The schematic of this fabrication process is explained in more details in a previous paper [12].

Abrasion Test. The effect of abrasion resistance on the composite surface was studied based on the ISO 20871-2001 standard using a HAIDA International (ASTM D5963) rotatory drum abrasion tester. The cut cylindrical samples were abraded on a rotatory drum covered with 60 grit sand paper with an applied constant load of 10N. A total of 324 samples, designed using the Taguchi experimental design described in more details below, were abraded, and the abrasion resistance index (ARI) for each was calculated. The ARI was calculated using the formula in abrasion test ISO 20871 standard, where $\Delta s_1$ is the mass loss of the standard rubber in mg, $d_2$ is the density of the sample, $\Delta s_2$ is the mass loss of the sample in mg and $d_1$ is the density of the standard rubber:

$$ARI = \frac{\Delta s_1 \cdot d_2}{\Delta s_2 \cdot d_1} \times 100$$

Roughness Test. To determine the extent of texturing and to validate the visual observation from the scanning electron microscope images, the surface roughness of all the composite surfaces was measured using a linear surface profilometer (Mitutoyo, Japan, SJ-210) with a diamond probe tip radius of 2 micron, and 4 mm linear scan distance. The mean surface roughness was measured as the average of the peaks (Ra) during the linear scan.

Ice Friction Tests. The cylindrical samples manufactured were mounted on a custom rig using a double sided adhesive tape on a customized SATRA setup. To determine the effect of abrasion on the coefficient of friction on ice by incorporation of fibers for hybrid composite, the COF was measured before and after abrasion. Varying loads and speeds of 250N, 400N and 500N, and 0.3 m/s, 0.4 m/s and 0.5 m/s, respectively, were used to conduct a detailed comprehensive study to determine the optimal condition and sensitivity analysis based on the Taguchi design. By varying the normal load and sliding speed on SATRA, the static coefficient of friction on ice was affected by abrasion was analyzed.

2.6. Taguchi Experimental Design. The Taguchi method is a powerful experimental design tool that systematically finds the effect of various parameters on selected outcome measures without the need for a full factorial set of experiments. Instead, fractional factorial designs called orthogonal arrays can be used to select the minimal set of experiments to find the effect of interest using Analysis of Variance (ANOVA) as a tool for analysis. The Taguchi method also defines the method for identifying and optimizing parameters leading to the desired response [25, 26]. In this method, output of the orthogonal arrays is optimized with respect to signal to noise ratio (i.e. mean to standard deviation) ratio (S/N) of the response rather than the response itself, with the aim to minimize the process variability. In this study, Taguchi orthogonal array design was used for four control factors each at three levels according to L27 (313) orthogonal array design. Table 1 summarizes control parameters and their level used in this study. According to a full-factorial experiment, four factors each at three levels would require $3^4=81$ separate experiments. Using Taguchi's factorial experiment approach, the number of experiments was reduced to 27 runs. The first and second columns of the Taguchi table (Table 2) were assigned to fiber content (A) and mold temperature (B), while the fifth and ninth columns were assigned to sliding velocity (C) and the normal load (D). The remaining columns were allocated to the interaction of control parameters as well as experimental errors.

TABLE 1

Control factors and their level used for the experiments.

| Control Factor | Level Low | Medium | High | Unit |
|---|---|---|---|---|
| A: Fiber content | 1 | 4 | 8 | % |
| B: Mold Temperature | 120 | 130 | 140 | ° C. |
| C: Sliding Velocity | 0.3 | 0.4 | 0.5 | m/s |
| D: Normal Load | 250 | 400 | 500 | N |

For each run, a sample of composite material is tested for its slip-resistance before and after simulated wear using the SATRA machine. This test measures the coefficient of friction (COF) by applying a specified normal force pressing the test material onto a test surface and then moving the test surface horizontally. Each test was repeated for three trials for a given composite leading to 324 trials in total (27 experiments according to Taguchi design×2 composite materials×2 conditions: before/after abrasion×3 trials=324 trials). The COF is transformed into signal-to-noise ratio as logarithmic transformation of the loss function using the "larger-is-better" performance characteristic as follows [25, 26]:

$$\frac{S}{N} = -10 * \log\left(\frac{\Sigma\left(\frac{1}{y^2}\right)}{n}\right)$$

Where "n" is the number of observations and "y" is the observed data. This "larger-is-better" characteristic is suitable to determine the optimal manufacturing parameters leading to maximized COF (i.e. improved slip-resistance properties). ANOVA is also performed in order to determine the factors that have the greatest impact on the slip-resistance performance of the textured composite material. With the results of S/N ratio and ANOVA, the optimal combination of design parameters is determined to an acceptable level of accuracy. As the last step in design of experiment, the confirmation experiment is performed in order to validate the conclusion drawn during the analysis step. The estimated S/N ratio for specific COF using the optimum level of factors can be obtained using the following predictive equation [25, 26]:

$$\overline{\eta}_{opt} = \overline{T} + \sum_{j=1}^{k}(\eta - \overline{T})$$

Where $\overline{\eta}_{opt}$=overall experiment average for S/N ration T=mean of the S/N ratio at the optimum parameter level; k=number of main design parameters that significantly affect the slip-resistance of the textured composite material. Finally, the experimental results for COF using optimal process parameters are compared to the predicated value to ensure the validity of drawn conclusion.

Surface Morphology. The surface morphology of each of the composite surfaces was observed under a scanning electron microscope (JEOL JSM 6060) both before and after abrasion. From the images obtained, the presence of carbon fibers and PBO fibers was observed along with the void fraction and their effect on the final morphology of the textured composite surface after abrasion.

Results

Figure 2:
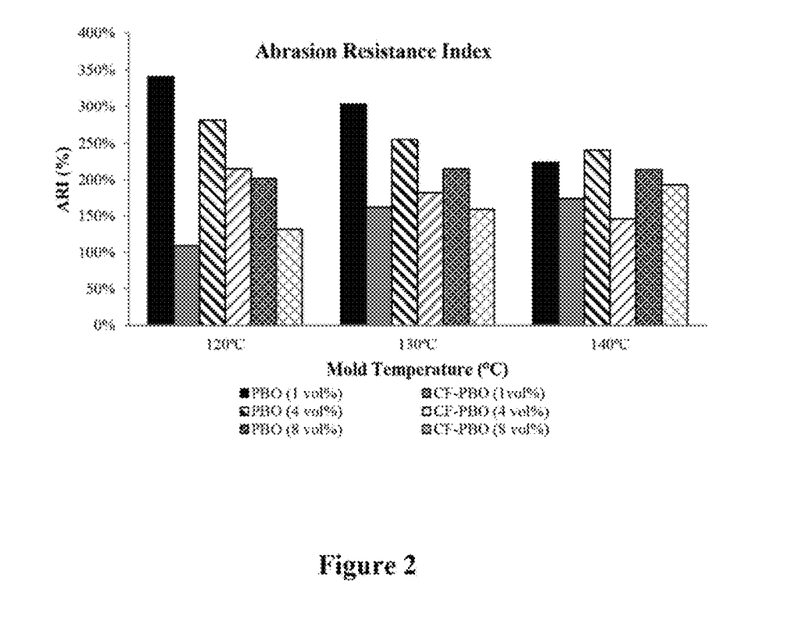
FIG. 2 illustrates the abrasion resistance index for composites at different volume fractions. Black and gray bars represent PBO-TPU and CF-PBO-TPU composites at 1 vol % (solid), 4 vol % (dashed) and 8 vol % (dotted), respectively. Higher ARI values are better.

Abrasion Resistance Index: The abrasion resistance of each of the composites at different levels was investigated and their abrasion resistance index was calculated. Abrasion resistant index is a quantitative measure to determine the abrasion resistance of a material surface as compared to a standard rubber. 100% ARI would indicate same abrasion resistance as a standard rubber, whereas an ARI>100% would indicated higher abrasion resistance. As evident from FIG. 2, the abrasion resistance of the PBO composite was much higher as compared to the PBO/CF composite due to the presence of stiff carbon fiber particles that make it easier to abrade the surface [27]. As shown in FIG. 2, the Abrasion resistance index for composites at different volume fractions. Black and grey bars represent PBO-TPU and CF-PBO-TPU composites at 1 vol % (solid), 4 vol % (dashed) and 8 vol % (dotted), respectively. Higher ARI values are better.

The abrasion resistance index has a direct correlation with the roughness. After abrasion, the surface becomes rougher, thus the abrasion resistance decreases because of the presence of additional surface area created. This increase in surface area causes the surface to grip the sand paper better and thereby causes increased abrasion as evident from the ARI in FIG. 2. In the case of CF-PBO composites, the presence of carbon fibers debris after abrasion is responsible for even greater abrasion as they act as additional particles to abrade the surface further, since carbon fibers are brittle fibers as compared to PBO fibers [23].

Figure 3:
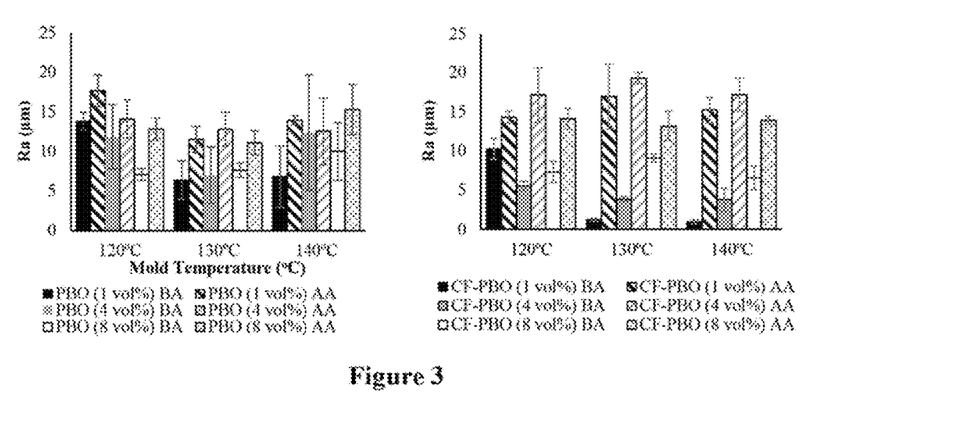
FIG. 3 illustrates a roughness comparison for a) PBO-TPU composites and b) PBO-CF-TPU composites (BA—before abrasion, AA—After Abrasion). Solid and dashed bars (black=1 vol %, grey=4 vol %, white=8 vol %) represent composites before and after abrasion, respectively.

Roughness: The degree of surface texturing for the various composites was quantified through measurement of their surface roughness (Ra). As evident from FIG. 3, the surface roughness of each of the composites increases after abrasion. This is also evident from the SEM images in FIG. 9 as well after abrasion where we can observe a large amount of matrix abrasion. FIG. 3 illustrates a Roughness Comparison for a) PBO-TPU composites and b) PBO-CF-TPU composites (BA—before abrasion, AA—After Abrasion). Solid and dashed bars (Black=1 vol %, grey=4 vol %, white=8 vol %) represent composites before and after abrasion, respectively.

Statistical Analysis of the ice friction properties. Minitab17 was used for orthogonal experimental design. Table 2 summarizes the experimental design as well as the output results using L27 orthogonal arrays before and after abrasion for PBO and CF-PBO composites. This orthogonal array design has 27 rows corresponding to the number of experiments with 13 columns at 3 levels. The output results were converted to S/N ratio considering larger-the-better criterion with the overall mean of −8.73 dB and −5.86 dB for fresh and abraded PBO composite as well as −9.55 dB and −5.05 dB for the CF-PBO composite counterparts.

TABLE 2

Test condition and output results using L27 orthogonal array design. COFi and COFii represent average COF value for 3 trials before and after abrasion, respectively.

| | | | | | PBO-TPU | | | | CF-PBO-TPU | | | |
|---|---|---|---|---|---|---|---|---|---|---|---|---|
| Runs | A (%) | B (° C.) | C(m/s) | D (N) | $COF_i$ | $S/N_i$ | $COF_{ii}$ | $S/N_{ii}$ | $COF_i$ | $S/N_i$ | $COF_{ii}$ | $S/N_{ii}$ |
| 1 | 1 | 120 | 0.3 | 250 | 0.47 | −6.93 | 0.76 | −7.31 | 0.28 | −12.11 | 0.64 | −4.45 |
| 2 | 1 | 120 | 0.4 | 400 | 0.40 | −8.12 | 0.43 | −8.09 | 0.28 | −11.14 | 0.60 | −4.99 |
| 3 | 1 | 120 | 0.5 | 500 | 0.35 | −9.28 | 0.57 | −5.70 | 0.30 | −10.53 | 0.52 | −5.73 |
| 4 | 1 | 130 | 0.3 | 400 | 0.31 | −11.56 | 0.52 | −6.67 | 0.28 | −11.44 | 0.54 | −5.84 |
| 5 | 1 | 130 | 0.4 | 500 | 0.29 | −11.83 | 0.54 | −5.33 | 0.28 | −11.26 | 0.63 | −4.20 |
| 6 | 1 | 130 | 0.5 | 250 | 0.37 | −9.95 | 0.54 | −5.56 | 0.42 | −7.55 | 0.56 | −5.95 |
| 7 | 1 | 140 | 0.3 | 500 | 0.27 | −11.72 | 0.50 | −6.19 | 0.29 | −11.59 | 0.53 | −6.39 |
| 8 | 1 | 140 | 0.4 | 250 | 0.32 | −11.37 | 0.53 | −5.59 | 0.34 | −10.77 | 0.69 | −3.63 |
| 9 | 1 | 140 | 0.5 | 400 | 0.33 | −10.03 | 0.51 | −5.90 | 0.29 | −11.83 | 0.61 | −4.40 |
| 10 | 4 | 120 | 0.3 | 400 | 0.42 | −7.67 | 0.55 | −5.19 | 0.37 | −8.72 | 0.63 | −5.41 |

TABLE 2-continued

Test condition and output results using L27 orthogonal array design. COFi and COFii represent average COF value for 3 trials before and after abrasion, respectively.

| | | | | | PBO-TPU | | | | CF-PBO-TPU | | | |
|---|---|---|---|---|---|---|---|---|---|---|---|---|
| Runs | A (%) | B (° C.) | C(m/s) | D (N) | $COF_i$ | $S/N_i$ | $COF_{ii}$ | $S/N_{ii}$ | $COF_i$ | $S/N_i$ | $COF_{ii}$ | $S/N_{ii}$ |
| 11 | 4 | 120 | 0.4 | 500 | 0.40 | −8.26 | 0.50 | −6.04 | 0.32 | −10.11 | 0.59 | −5.18 |
| 12 | 4 | 120 | 0.5 | 250 | 0.47 | −7.58 | 0.59 | −4.69 | 0.42 | −7.64 | 0.60 | −5.82 |
| 13 | 4 | 130 | 0.3 | 500 | 0.33 | −9.62 | 0.59 | −4.62 | 0.27 | −11.47 | 0.57 | −5.65 |
| 14 | 4 | 130 | 0.4 | 250 | 0.47 | −7.04 | 0.44 | −7.29 | 0.43 | −7.83 | 0.61 | −4.52 |
| 15 | 4 | 130 | 0.5 | 400 | 0.36 | −9.15 | 0.51 | −5.94 | 0.36 | −9.57 | 0.63 | −4.70 |
| 16 | 4 | 140 | 0.3 | 250 | 0.49 | −6.81 | 0.57 | −5.23 | 0.31 | −10.20 | 0.60 | −4.47 |
| 17 | 4 | 140 | 0.4 | 400 | 0.40 | −8.68 | 0.53 | −6.14 | 0.30 | −10.81 | 0.58 | −5.18 |
| 18 | 4 | 140 | 0.5 | 500 | 0.37 | −9.10 | 0.63 | −4.04 | 0.38 | −8.67 | 0.49 | −6.37 |
| 19 | 8 | 120 | 0.3 | 500 | 0.45 | −7.64 | 0.47 | −6.81 | 0.32 | −10.06 | 0.54 | −5.70 |
| 20 | 8 | 120 | 0.4 | 250 | 0.48 | −6.56 | 0.59 | −4.58 | 0.43 | −7.59 | 0.67 | −3.80 |
| 21 | 8 | 120 | 0.5 | 400 | 0.41 | −8.37 | 0.51 | −6.07 | 0.41 | −7.81 | 0.62 | −4.37 |
| 22 | 8 | 130 | 0.3 | 250 | 0.51 | −6.24 | 0.51 | −5.94 | 0.50 | −6.59 | 0.61 | −4.59 |
| 23 | 8 | 130 | 0.4 | 400 | 0.45 | −7.45 | 0.47 | −7.07 | 0.37 | −9.15 | 0.55 | −5.26 |
| 24 | 8 | 130 | 0.5 | 500 | 0.37 | −9.64 | 0.50 | −6.07 | 0.41 | −8.52 | 0.55 | −5.36 |
| 25 | 8 | 140 | 0.3 | 400 | 0.34 | −9.69 | 0.54 | −5.57 | 0.31 | −10.26 | 0.59 | −4.64 |
| 26 | 8 | 140 | 0.4 | 500 | 0.37 | −8.72 | 0.45 | −6.97 | 0.38 | −8.82 | 0.54 | −5.31 |
| 27 | 8 | 140 | 0.5 | 250 | 0.47 | −6.78 | 0.57 | −5.24 | 0.52 | −5.80 | 0.59 | −4.56 |

Figure 4:
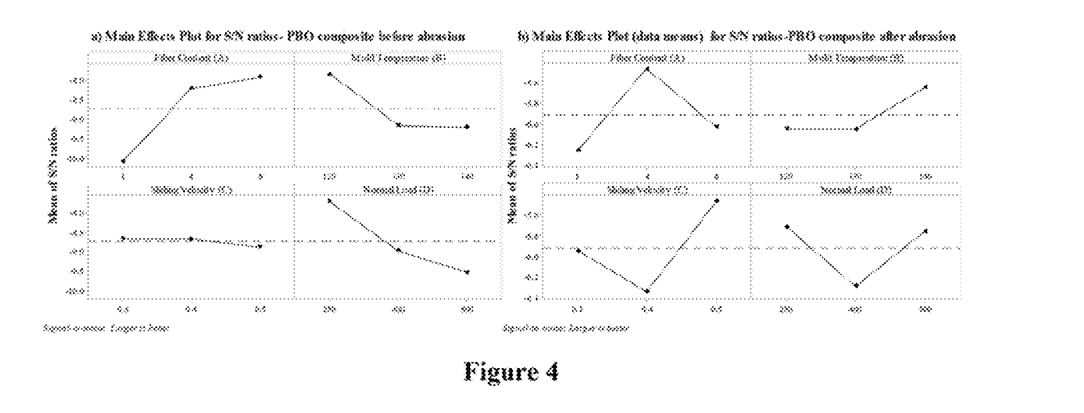
FIG. 4 illustrates the effect of control factor on ice friction properties for PBO composite: a) before abrasion, b) after abrasion.
Figure 5:
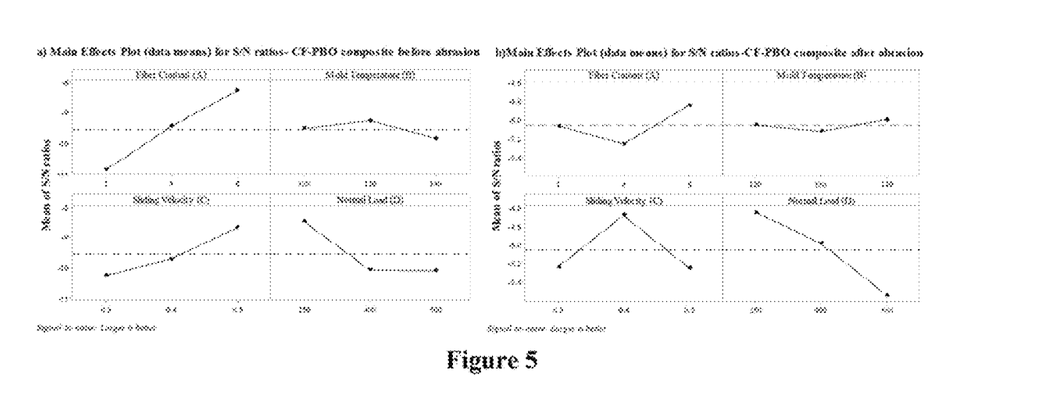
FIG. 5 illustrates the effect of control factor on ice friction properties for CF-PBO composite: a) before abrasion, b) after abrasion.

FIGS. 4 and 5 demonstrate the effect of control factors on ice friction properties of PBO and CF-PBO composites. The reference line represents the overall mean for each control factor for a given composite. A specific control factor would have a main effect when the line is not horizontal. The steeper the slope of the line is, the greater the magnitude of the main effect. The process parameter settings leading to maximum S/N ratio result in the optimum quality with minimum variance, thereby the best ice friction properties would be achieved at the highest value of S/N ratio in the graph. It is evident from the graph that S/N ratio alters with the change of control parameters setting from one level to the other. For PBO composite, the factor combination of A3, B1, C1 and D1 for fresh sample as well as A2, B3, C3 and D1 for abraded samples give the maximum ice friction properties. Whereas, the factor combination of A3, B2, C3 and D1 and A3, B3, C2, D1 would result in maximum ice friction properties in fresh and abraded CF-PBO composite, respectively.

The S/N ratio response is given in Table 1. Control factors and their level used for the experiments, which contains a row for the average signal-to-noise ratio for each factor level with delta represents the difference between the maximum and minimum average signal-to-noise ratios. It is evident from the tables that the fiber content has the significant effect on ice frictional properties of fresh PBO and CF-PBO composites. It should further be noted that the effect of fiber content is more dominant in ice frictional properties after abrasion for PBO composite compared to CF-PBO composite, which could be related to the abrasion-resistance nature of PBO fibres as well as the rigidity of the carbon fibers that enabled them to penetrate and fracture the ice substrate underneath during the sliding process. As a consequence of wear-resistance nature of PBO fibers, a greater degree of matrix abrasion occurred during simulated wear test rather fiber abrasion resulting in exposure of more fibrous phase at composite surface. These newly exposed fibrous phases not only caused composite to retain its slip-resistance properties over extended use, but also demonstrate improved ice frictional performance even after abrasion.

TABLE 3

Response table for signal-to-noise ratio for PBO composite.

| | PBO-before abrasion | | | | PBO-1 run abrasion | | | |
|---|---|---|---|---|---|---|---|---|
| Level | (A) | (B) | (C) | (D) | (A) | (B) | (C) | (D) |
| 1 | −10.1 | −7.8 | −8.6 | −7.6 | −6.3 | −6.1 | −5.9 | −5.7 |
| 2 | −8.2 | −9.2 | −8.7 | 8.9 | −5.4 | −6.1 | −6.3 | −6.3 |
| 3 | −7.9 | −9.2 | −8.8 | −9.5 | −6.1 | −5.6 | −5.5 | −5.8 |
| Delta | 2.1 | 1.3 | 0.2 | 1.8 | 0.8 | 0.4 | 0.9 | 0.6 |
| Rank | 1 | 3 | 4 | 2 | 2 | 4 | 1 | 3 |

TABLE 4

Response table for signal-to-noise ratio for CF-PBO composite.

| | CF-PBO-0 run abrasion | | | | CF-PBO-1 run abrasion | | | |
|---|---|---|---|---|---|---|---|---|
| Level | (A) | (B) | (C) | (D) | (A) | (B) | (C) | (D) |
| 1 | −10.9 | −9.5 | −10.3 | −8.4 | −5.1 | −5.1 | −5.2 | −4.6 |
| 2 | −9.4 | −9.3 | −9.7 | −10.1 | −5.2 | −5.1 | −4.7 | −4.9 |
| 3 | −8.3 | −9.9 | −8.6 | −10.1 | −4.8 | −4.9 | −5.2 | −5.5 |
| Delta | 2.6 | 0.6 | 1.6 | 1.6 | 0.4 | 0.1 | 0.5 | 0.8 |
| Rank | 1 | 4 | 3 | 2 | 3 | 4 | 2 | 1 |

Figure 6:
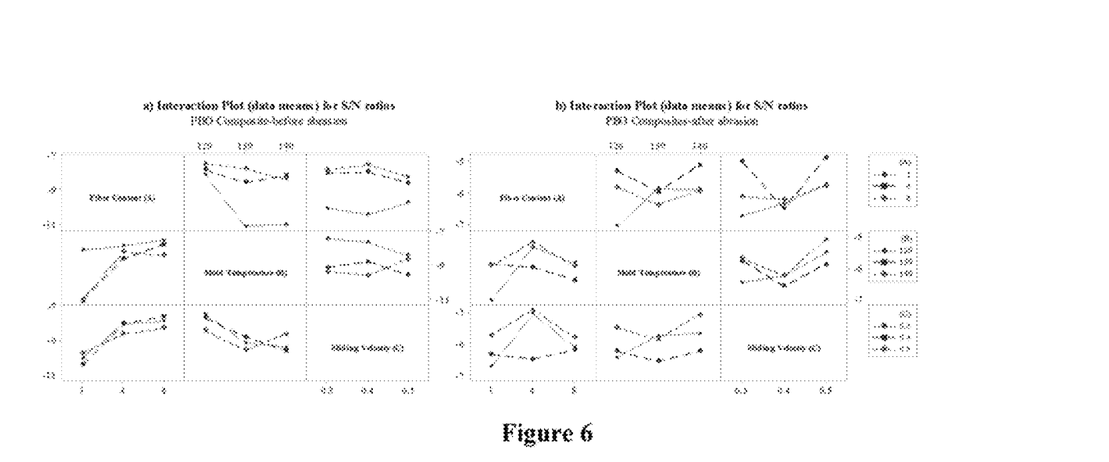
FIG. 6 illustrates the interaction graph between control factors for PBO composites; a) before abrasion, b) after abrasion.
Figure 7:
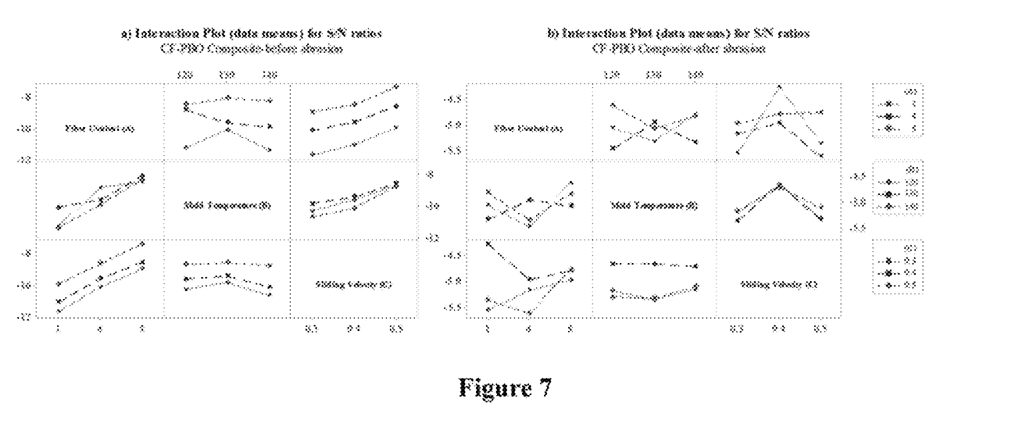
FIG. 7 illustrates the interaction graph between control factors for CF-PBO composites; a) before abrasion, b) after abrasion.

The interaction effect of control parameters is depicted in FIG. 6 and FIG. 7. The interaction plot shows how the relationship between one control factor and ice frictional properties depends on the value of the other control factors. When lines on the interaction plot are parallel, there is no interaction between the parameters while strong interactions exist if the lines cross. An examination of the interaction plots shows that there is small interaction between process parameters, which is assessed further using ANOVA to determine which are the statistically significant factors and interactions.

ANOVA and effect of Factors: ANOVA test was performed for a level of significance of $p<0.05$ to determine the factors and interaction that have significant effect on the output results. Table 5 and 6 show the results of ANOVA for PBO and CF-PBO composite. The last column of the table represents the percentage of contribution for each control factor and their interaction which are employed to determine the corresponding effect on the final output. From the tables, one can observe that fiber content (36%, p=0.002), normal load (23%, p=0.006) as well as mold temperature (16%, p=0.013) have great influence on ice friction properties of fresh PBO composite. However, for fresh CF-PBO composite, the only control factor that affects its ice friction properties is fiber content with a 40% of contribution (p=0.024). This could be related to the softer nature of polymeric PBO fibers as compared to stiff CF. This difference could further affect the viscosity of the compound, fiber orientation and surface characteristics during the manufacturing process (as evident in SEM before abrasion images FIG. 8 and FIG. 9), which may alter the response of the composite to the testing parameters (i.e. sliding speed and normal load) during the actual experiment. More importantly, the effect of control factors and their interaction were not significant for either composite after abrasion. This is advantageous as both composites showed improved ice friction properties after abrasion with average COF values of 0.53±0.06 for PBO and 0.59±0.04 for CF-PBO composite with no sensitivity to the testing parameters.

combination for each composite material. The S/N ratio for each composite was also predicted at optimum combination level of control factors using Minitab software and summarized in Table 7.

TABLE 7

Confirmation test for ice friction properties.

| Mean COF value | Optimal control parameters | | |
|---|---|---|---|
| | Prediction | Experimental | Error (%) |
| PBO composite- before abrasion | A3B1C1D1 0.51 | 0.53 | 3.7 |
| PBO composite- after abrasion | A2B3C3D1 0.59 | 0.62 | 4.8 |
| CF-PBO composite- before abrasion | A3B2C3D1 0.5 | 0.48 | 4.1 |
| CF-PBO composite- after abrasion | A3B3C2D1 0.62 | 0.65 | 4.6 |

TABLE 5

Analysis of variance for signal-to-noise ratios for ice slip-resistance properties of PBO composite. Seq SS: sequential sum of squares, P: percentage of contribution.

| | PBo-before abrasion | | | | PBO-after abrasion | | | |
|---|---|---|---|---|---|---|---|---|
| Source | Seq SS | F test | P value | P (%) | Seq SS | F test | P value | P (%) |
| A: Fiber content | 25.18 | 21.91 | 0.002 | 35.83 | 3.027 | 1.47 | 0.302 | 13.02 |
| B: Mold Temperature | 11.16 | 9.72 | 0.013 | 15.88 | 0.97 | 0.47 | 0.644 | 4.19 |
| C: Sliding Velocity | 0.27 | 0.24 | 0.793 | 0.39 | 3.46 | 1.68 | 0.263 | 14.90 |
| D: Normal Load | 15.99 | 13.92 | 0.006 | 22.75 | 1.88 | 0.92 | 0.45 | 8.10 |
| A*B | 8.49 | 3.7 | 0.075 | 12.09 | 3.32 | 0.81 | 0.562 | 14.31 |
| A*C | 1.85 | 0.81 | 0.564 | 2.63 | 3.11 | 0.76 | 0.59 | 13.37 |
| B*C | 3.87 | 1.68 | 0.270 | 5.51 | 1.29 | 0.32 | 0.858 | 5.46 |
| ERROR | 3.45 | | | | 6.17 | | | |
| TOTAL | 70.28 | | | | 23.25 | | | |

TABLE 6

Analysis of variance for signal-to-noise ratios for ice slip-resistance properties of PBO-CF composite. Seq SS: sequential sum of squares, P: percentage of contribution.

| | CF-PBO-before abrasion | | | | CF-PBO-after abrasion | | | |
|---|---|---|---|---|---|---|---|---|
| Source | Seq SS | F test | P value | P (%) | Seq SS | F test | P value | P (%) |
| A: Fiber content | 31.12 | 7.44 | 0.024 | 40.08 | 0.76 | 0.49 | 0.637 | 5.46 |
| B: Mold Temperature | 1.61 | 0.39 | 0.696 | 2.07 | 0.07 | 0.04 | 0.956 | 0.50 |
| C: Sliding Velocity | 12.08 | 2.89 | 0.132 | 15.58 | 1.94 | 1.24 | 0.355 | 13.78 |
| D: Normal Load | 16.22 | 3.88 | 0.083 | 20.89 | 3.71 | 2.36 | 0.175 | 26.36 |
| A*B | 3.61 | 0.43 | 0.782 | 4.65 | 1.07 | 0.34 | 0.841 | 7.61 |
| A*C | 0.06 | 0.01 | 1 | 0.48 | 1.71 | 0.55 | 0.71 | 12.17 |
| B*C | 0.37 | 0.04 | 0.995 | 3.02 | 0.09 | 0.03 | 0.998 | 0.66 |
| Error | 12.54 | | | | 4.71 | | | |
| TOTAL | 77.63 | | | | 14.08 | | | |

Figure 8:
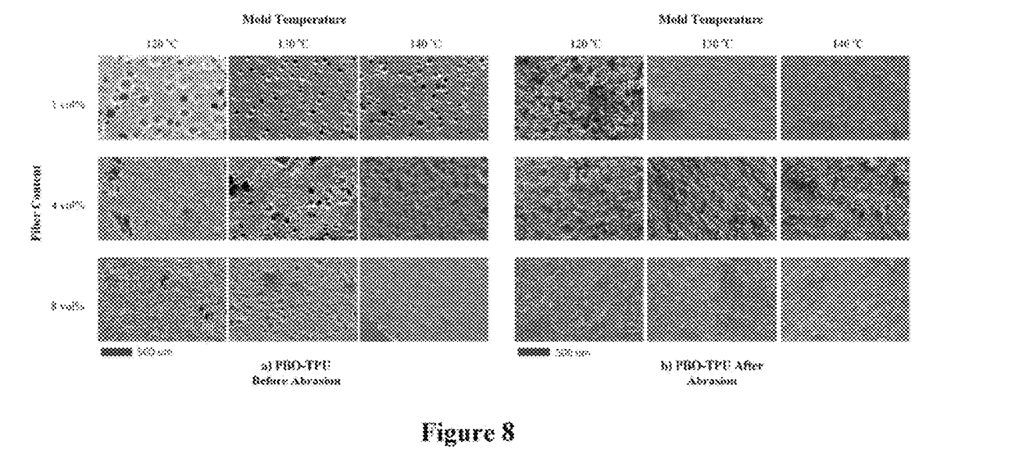
FIG. 8 illustrates secondary electron images of textured surfaces at different fiber content (1 vol %, 4 vol % and 8 vol %) and mold temperatures (120° C., 130° C., 140° C.) for a) PBO-.
Figure 9:
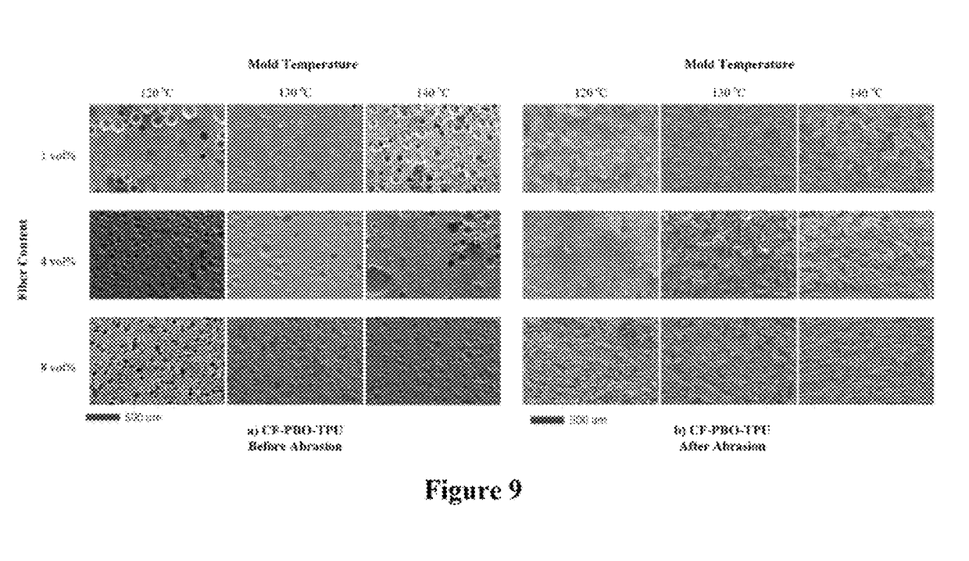
FIG. 9 illustrates secondary electron images of textured surfaces at different fiber content (1 vol %, 4 vol % and 8 vol %) and mold temperatures (120° C., 130° C., 140° C.) for a) PBO-CF-TPU composites before abrasion and b) CF-PBO-TPU composites after abrasion.

Confirmation experiment: The optimal combination of control factors have been identified in previous section. However, the confirmation experiment is a final step in any design of experiment approach to predict and verify improvement in observed response through the use of optimum combination level of control factors. The confirmation experiment was performed by taking arbitrary set of factor 3.4 Surface Morphology: FIG. 8 and FIG. 9 show SEM images of both composite materials before and after abrasion. Based on visual observation of the images, we can observe larger number of PBO and carbon fibers protruding out of the surface after abrasion as compared to before abrasion. This can be attributed to the effect of abrasion causing the matrix to shear off exposing new fibers from within the composite surface. With increasing mold temperature, there is no significant improvement in the surface roughness thereby the coefficient of friction. However, the presence of carbon fibers in addition to the PBO fibers cause more abrasion as can be evident from the SEM images in FIG. 8 and FIG. 9 as well as the ARI in FIG. 2. Abrasion results in the conversion of external work of friction in creation of surfaces through wear [28]. Carbon fibers are expected to fracture more easily than PBO fibres since carbon fiber is more brittle [29]. The fractured artifacts of carbon fibers are likely to possess sharp surfaces which act as additional particles for causing further wear of the surface [27]. With larger fiber content in the matrix, there are two competing factors which determine final abrasion of the surface: greater fragment creation which increases wear and rapid surface saturation by these wear particles. Examining the SEM images, a clear trend of wear with the increase in the fiber content cannot be inferred. This may be due to the interplay of the two competing factors highlighted above.

General Findings. In this example, the design of the composite materials was optimized by systematically varying a number of manufacturing and testing parameters (e.g. fiber content, molding temperature, sliding velocity and applied normal load) to evaluate their effect on slip resistance before and after simulated wear using the Taguchi method. The results demonstrate that fiber content at 8% volume fraction with mold temperature set at 120° C. for both PBO and CF-PBO composites would lead to maximum ice friction properties in these materials. The optimized composite design showed improved ice friction properties after simulated wear with no sensitivity to the testing conditions (i.e. sliding velocity and normal load), implying their dominance in the applications where enhanced tribiological performance is required.

Comparison to prior studies. Several studies corroborated the suitability of PBO and carbon fibers as reinforcement of high-performance composites due to their good self-lubricant properties, chemical resistance as well as remarkable tensile strength and modulus [9, 10, 12, 30-33]. However, the disadvantages of CF, such as low elongation and poor fracture toughness [34], limit its applications under harsh sliding conditions. Motivated by excellent abrasion resistant nature of PBO to compensate for CF disadvantages, few studies have suggested hybrid incorporation of CF and PBO fibers to improve comprehensive properties of polymer-matrix composites [8, 35, 36]. Chen et al [8] reported that incorporation of CF and PBO fibers on polyimide (PI) matrix improve the mechanical and tribological properties of PI-based composites in ocean environment. Another study confirmed the superior wear resistance of PI composites reinforced with these two fibers compared to those with single incorporation of PBO or CF, where sliding against stainless steel in sea water [35]. Similarly, in the current study, hybrid incorporation of the two fibers led to improved ice friction properties of TPU composite before and after simulated wear. Flexible PBO microfibers can effectively absorb and dissipate the friction energy, while the hard carbon fibers protect the PBO/TPU interfaces and the PBO from mechanical damage.

Practical Implication. Low friction on icy surfaces is due to the thin water film generated at the interface as a result of frictional heating. At temperature above −10° C. and sliding velocity greater than −0.01 ms$^{-1}$, frictional heating is sufficiently high to melt the ice surface and create a lubricating fluid [37, 38]. Well documented in the literature, the presence and thickness of water film is highly dependent upon the thermal properties of the slider object as well as sliding velocity. The frictional heating and thickness of the lubricating fluid increase with velocity, resulting in a reduction of coefficient of friction on ice as speed increases. Several studies report on variation of ice friction properties with the inverse square roots of velocity [38-40]. However, this was not the case for the range of sliding speeds (0.3-0.5 ms$^{-1}$) in the current study. The ice friction properties of both composites were independent of sliding velocity for the two investigated conditions (before and after abrasion). This could be related to the unique microscopic structures of the samples, where nearly vertical aligned fibers extend out from the surface. These microscopic fibers (average protrusion lengths of: PBO-TPU=150 μm and CF-PBO-TPU=125 μm) can pass the thickness of lubricating layer (~1 μm close to 0° C.) and dig into ice substrate underneath, to provide mechanical interlocking and traction on icy surfaces.

Normal load can have a significant contribution in friction properties of the components contacting ice surface. The contact area at the interface generally increases with an increase in the normal load, resulting in an increase in the static friction force with load [41]. In the current example, the normal load showed a significant contribution on the ice friction properties of PBO composite in contrast to CF-PBO composite before abrasion. This could be related to the flexible nature of PBO fibers in comparison to stiff CF, which makes these polymeric fibers sensitive to the applied load where in contact with a hard surface like ice. As such, with respect to the magnitude of the applied normal load, PBO fibers may get bent or buckled at higher loads during the sliding process, thereby cannot penetrate to the ice substrate underneath and provide ice traction via mechanical interlocking. After abrasion, the ice friction properties of both composites demonstrate no sensitivity to the applied normal load. This could be related to the induced surface roughness during abrasion tests leading to a remarkable surface roughness in both composites (PBO=13.521±1.9053 um, PBO-CF=15.7183±1.898). The improved surface roughness would increase the fractions of areas in intimate contact in the abraded samples, which were initially limited to the tips of adjoining asperities in their fresh counterparts, thereby ensuring a large contact area between the specimen and ice substrate underneath leading to enhanced ice grip.

The presence of voids can contribute to the ice friction abrasion properties due to the change in contact area.

Figure 10:
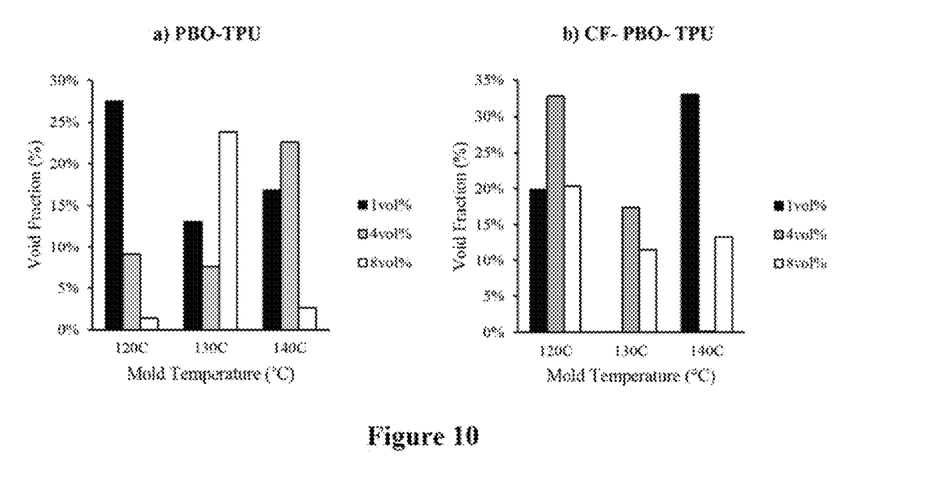
FIG. 10 illustrates the void fraction in a) PBO-TPU composite and b) CF-PBO-TPU composite. Blue, red and green bars represent composites at 1 vol %, 4 vol % and 8 vol %, respectively.

With larger void fraction, there is smaller contact area, hence higher ARI as evident from FIG. 2. For example, the void fraction for 1 vol % PBO-TPU at 120° C. is 27.54% (FIG. 10) and this can be seen with a high ARI value of 340.87% (FIG. 2). Voids during injection molding are collapsed due to the high pressure within the melt which reaches a uniform value after complete mold filling when the material is still molten. After the void collapse stage, the material cools down within the mold to "lock" the microstructure within the now solid matrix. At low pressures, the injection speed is slow hence the solidification time of the melt matrix within the die becomes an important contributor to the void content in the final micro-structure. Higher mold temperatures result in delayed solidification time which provides the opportunity for the materials to completely fill the mold and transmit uniform pressure to collapse the voids. However, very high mold temperatures can result in a softer matrix, which may lead to re-expansion of the pressurized voids after release of the injection pressure. As evident in FIG. 10, the void fraction of PBO-TPU composites at both 1 and 4 vol % shows a positive inflection point at 130° C. This may have been due to a competition between increasing void collapse tendency to better mold filling at higher temperatures and the softening of the matrix and subsequent void re-expansion for the same reason. However, at 8 vol % a negative inflection point is observed at 130° C. The difference in the inflection behaviour may have been due to large increase in the viscosity of the melt at 8 vol % which prevented proper mold filling (and hence pressure transmission) for void collapse at 120 and 130° C. This results in the respectively increasing void fractions at those temperatures. At 140° C., the overall viscosity had dropped resulting in greater contribution because of better mold filling and hence lower void fraction. For CF-PBO-TPU composite, a strong inflection point at 130° C. can be seen for 1 vol % fibres. For higher vol % fibers however, a decrease in the void content can be observed with increasing temperature, indicating its significant role on the void fraction due to change (increase) in viscosity of the matrix by the addition of fibers.

Fiber length could potentially have influence on the abrasion resistance and COF on ice if the protruding fibers of the different composites had significantly different lengths. In general, the length of the fiber pulled out did not show a strong dependence on the mold temperature across the various fiber volume fractions. Fiber pullout is primarily dependant on the matrix filler interfacial strength, aspect ratio, alignment and the tensile strength of the fibers [42]. Of these factors, fiber alignment is dependent on the injection processing conditions [43]. Lower temperature at the die results in greater overall shear forces which would create a greater tendency for fibres to align. From the surface roughness results in FIG. 3, it is seen the mold temperature does not have any significant effect on the surface roughness which indicated that all the processing conditions were sufficient to align the fibers to a high degree along the direction of injection.

In this study, a novel hybrid high friction composite material that utilizes both soft fibers and hard fibers to create a textured surface for applications that require high slip-resistant properties for extended use on icy surfaces was developed. The ice frictional properties were obtained before and after simulated wear for hybrid incorporation of CF and PBO fibers on TPU matrix. Using Taguchi experimental design analysis, we discovered that fiber content at 8% volume fraction with mold temperature sets at 120° C. would lead to maximum ice friction properties after abrasion (COF=0.61±0.053). The experimental results confirmed the validity of Taguchi method for enhancing frictional performance and optimizing the manufacturing process parameters under sliding conditions on wet icy surface. The presence of abrasion resistant PBO fibers within the composite enhanced the abrasion resistance of the final composite surface and together with TPU matrix, make it favourable for providing abrasion applications. These hybrid composite materials can maintain a high coefficient of friction on ice even after having experienced extensive wear. This makes materials like these to outperform existing materials in the applications where enhanced wear and slip resistance is required.

Moreover, the manufacturing process for fabrication of these textured surfaces may be more easily scaled up to industrial application due to its simplicity in terms of cost as compared to other expensive methods like photolithography, laser sintering, etc.

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

The invention claimed is:

1. A method of producing a composite which exhibits high friction properties on ice, said method comprising:
   a) melt blending matrix with fibers to produce a melted composite, wherein the fibers comprise carbon fibers and poly(p-phenylene-2,6-benzobisoxazole) (PBO) fibers and said matrix comprises thermoplastic polyurethane (TPU) matrix;
   b) injecting the melted composite into a mold and allowing the melted composite to solidify; and
   c) optionally removing at least a portion of an outermost layer of a composite such that the fibers protrude from a surface of the composite.

2. The method of claim 1, wherein injection temperature is about 130° C.

3. The method of claim 1, wherein said fibers comprise about 8 vol % of components.

4. The method of claim 3, wherein said carbon fibers and said PBO fibers are in 2:1 ratio by weight.

5. The method of claim 3, wherein said carbon fibers and said PBO fibers are in 2:1 ratio by weight.

6. The method of claim 1, wherein said fibers comprise about 8 vol % of components and the mold temperature is 120° C.

7. The method of claim 1, wherein said mold is shaped to allow substantially all the fibers in said composite to align to ensure substantially vertical protrusion of the fibers from the surface of the composite following removal of the outermost layer of a composite.

8. The method of claim 1, wherein said mold has a tapered shape and is in a vertical orientation parallel to the direction of injection.

9. The method of claim 1, wherein said composite has a coefficient of friction on ice of greater than 0.3.

10. The method of claim 1, wherein said composite has a coefficient of friction on ice of greater than 0.4.

11. The method of claim 1, wherein said composite has a coefficient of friction on ice of greater than 0.5.

12. The method of claim 1, wherein said composite is for incorporation into the outsole of footwear.

13. The method of claim 1, wherein the high friction is a coefficient of friction on ice of about 0.2 or greater.

14. The method of claim 1, further comprising producing the composite in which orientation of all of the fibers being substantially uniform.

* * * * *